3,166,023
CRANE ANTI-SKEW DEVICE
Samuel V. Lynd, Jr., Cincinnati, Ohio, assignor to The Tool Steel Gear and Pinion Company, Cincinnati, Ohio, a corporation of Ohio
Filed June 4, 1963, Ser. No. 285,508
6 Claims. (Cl. 105—163)

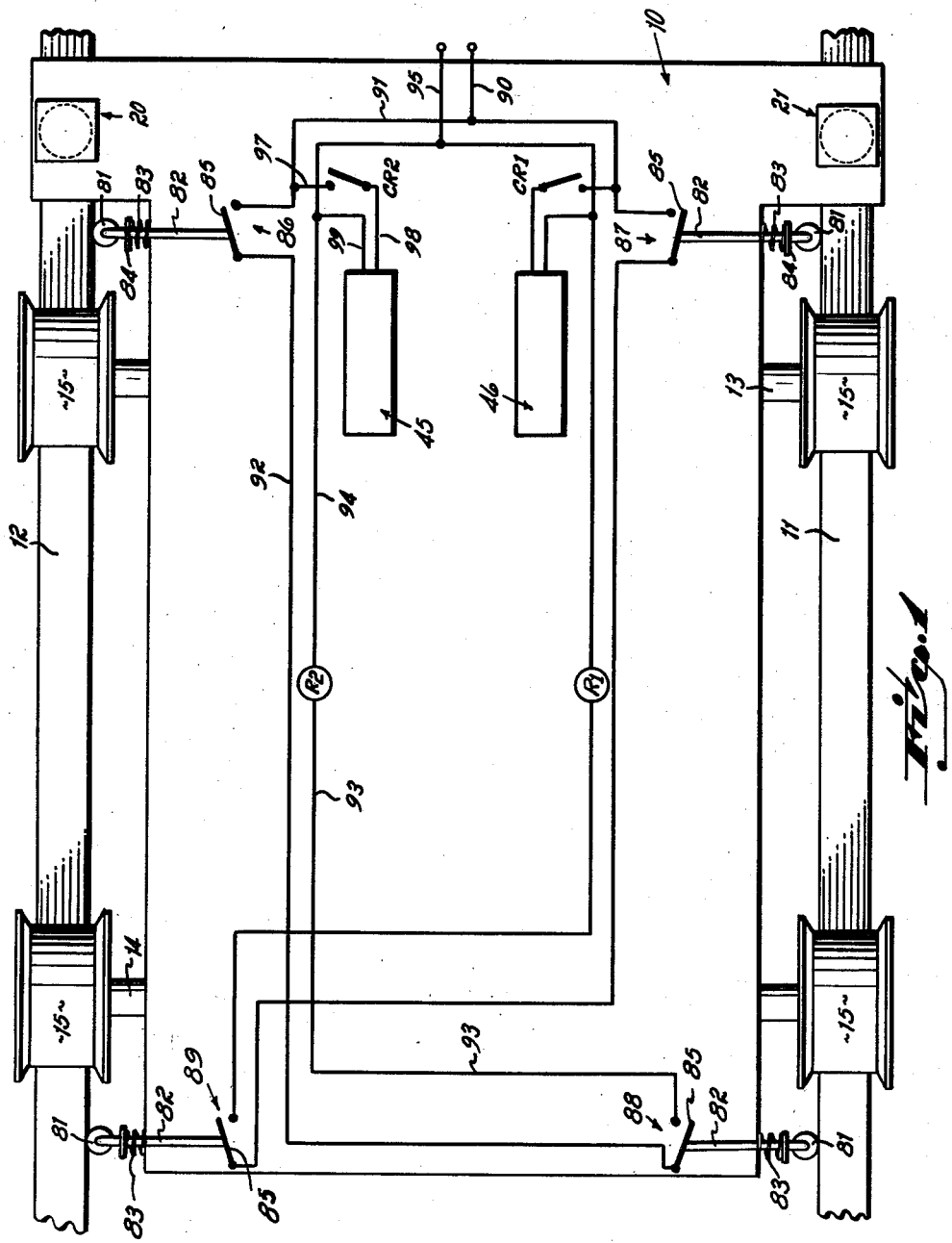

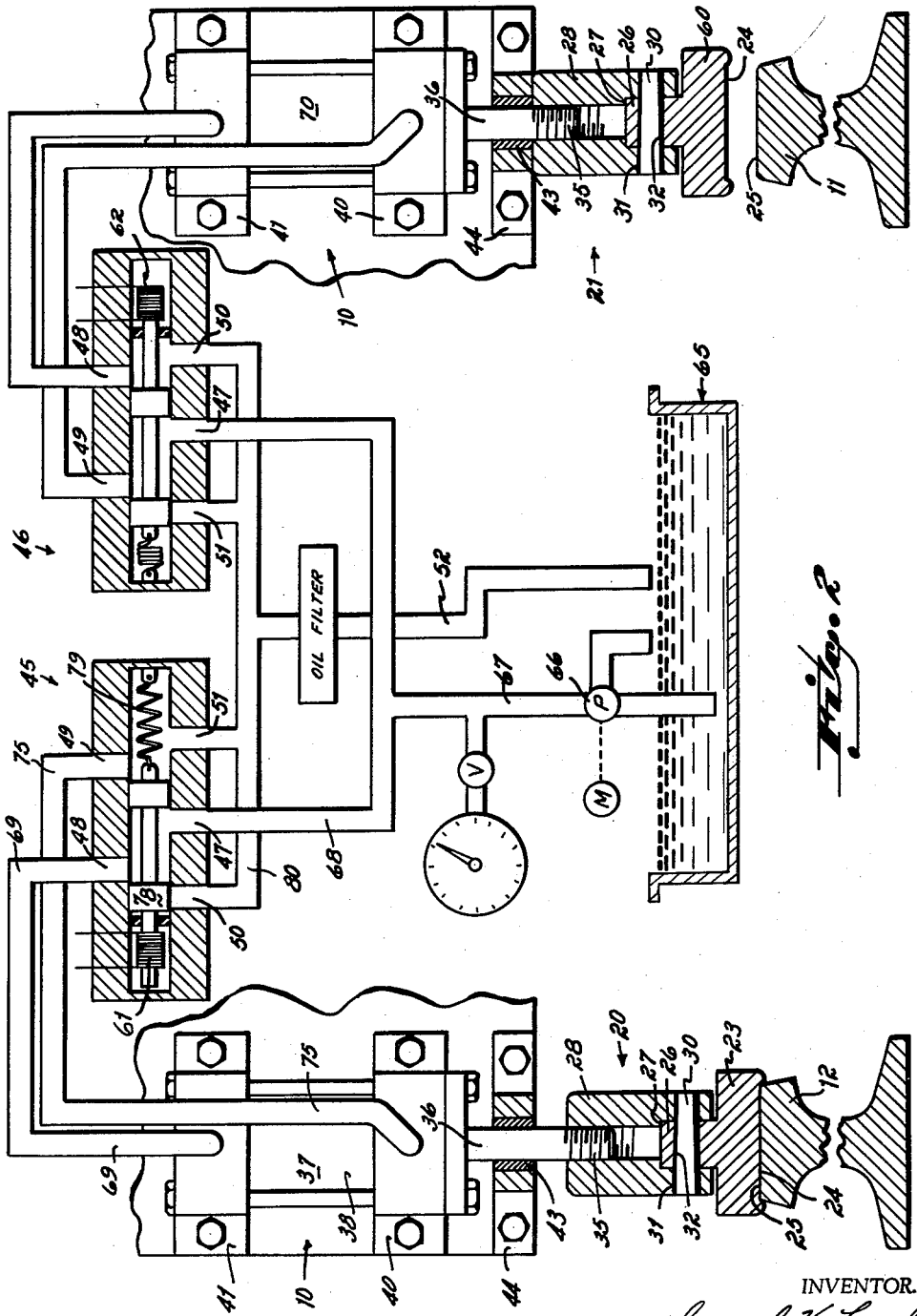

This invention relates to a skew correction device and more particularly to a skew correction device for use on overhead cranes.

Overhead cranes conventionally consist of a wheeled bridge supported upon spaced runway rails along which the bridge is longitudinally movable. Transfer rails mounted upon the bridge extend between the spaced runway rails and support a transversely movable trolley which carries the crane hoist.

It is an objective of this invention to provide a device operable to extend the wheel life and runway rail life of overhead cranes. Wheel wear is primarily a function of the bridge becoming skewed relative to the rails as a result of the trolley being located transversely off-center on the bridge. With the trolley in an off-center position, the center of gravity is located closer to one rail than the other and a turning moment is generated as the bridge moves along the runway rails. This problem is particularly actute upon starting and stopping of the bridge. If it becomes skewed upon starting it remains in that condition while moving along the rails with a consequent rubbing action and wearing between the wheel rim and the rail. Needless to say this is an undesirable condition resulting in frequent wheel replacement and after an extended period of time, the necessity to replace the runway rails. This invention minimizes this condition and decreases the frequency of wheel replacement.

Presently available anti-skew devices consist of hydraulic differential drive systems operable to vary the rate of rotation of the wheels upon opposite sides of the bridge when skew is detected. This type of apparatus includes a complete and expensive drive system including numerous valves, elaborate hydraulic drive apparatus, etc. It is an objective of this invention to provide a much less expensive anti-skew device in the form of an attachment usable upon any overhead crane irrespective of the type of drive; electric, hydraulic or gasoline combustion engine.

To accomplish the above objectives this invention incorporates a pair of friction brakes attached to the bridge and selectively engageable with one of the runway rails upon detection of skew so as to correct that condition by applying a frictional drag to the forwardmost side of the bridge. The drag results in the forwardmost side of the bridge moving slower than the other side until the bridge becomes transversely aligned between the runway rails. Since the skew correction occurs as a result of frictional drag between the bridge and rails rather than as a result of rotating the wheels on one side of the bridge faster than those on the other side, the apparatus of this invention may be incorporated as an attachment on a conventional crane. It does not require a completely new drive system.

These and other objectives and advantages of this invention will be more readily apparent from the following detailed description taken with the accompanying drawings in which:

FIGURE 1 is a schematic top plan view of the crane including a diagrammatic illustration of the electric control circuit, FIGURE 2 is a cross sectional view of the braking mechanism of this invention including a schematic illustration of the hydraulic control circuit.

Referring to FIGURE 1, it will be seen that the crane of this invention includes a bridge 10 movable along horizontally spaced parallel rails 11 and 12. It has the usual front axle 13 and the rear axle 14 with flanged wheels 15 drivingly attached to opposite ends of both axles. The axles and attached wheels may be driven by any conventional power source (not shown).

Mounted upon the front of the bridge 10 are a pair of frictional braking assemblies 20, 21. One assembly is mounted on each side of the bridge 10 directly over one of the rails 11, 12.

The frictional braking assemblies are identical so that only that one on the left side as viewed in FIGURE 2 will be described in detail. It should be understood however that an identical assembly is mounted upon the right side of the bridge 10 over the rail 11. The assembly 20 includes a brake shoe 23 having a bottom surface 24 of the same contour as that of the top surface 25 of the rail with which it is engageable. A post 26 extends upwardly into a counterbored portion 27 of an apertured mounting ring 28 which connects the brake shoe 23 to its actuating motor 37. To secure the shoe to the mounting ring a tapered lock pin 30 extends through aligned transverse apertures 31, 32 in the mounting ring and brake shoe respectively. The mounting ring 28 is in turn threaded onto the lower end 35 of a piston rod 36 of motor 37. The motor is a reciprocal hydraulic motor the cylinder 38 of which is secured to the bridge 10 of the crane by a pair of brackets 40, 41 bolted to the bridge. To maintain alignment between the brake shoe 23 and the rail 12 and to prevent excessive wear between the piston and cylinder, the piston rod 36 extends through a bushing 43 secured to the bridge by a bracket 44 bolted thereon.

Fluid flow to and from the hydraulic motor 37 is controlled by a conventional solenoid actuated two-way valve 45. A similar two-way valve 46 controls fluid flow to and from the hydraulic motor of the braking assembly 21. The valves 45 and 46 each have a fluid inlet port 47, two pressure ports 48, 49 connected to opposite ends of their respective actuating motors, and two drain ports 50, 51 connected to a drain conduit 52 which empties into a tank 65.

Referring to FIGURE 2, the hydraulic system is there shown in a conditon in which the brake shoe 23 of braking assembly 20 is engaged with the rail while the braking assembly 21 on the opposite side of the bridge is disengaged from the rail. In this condition of the system, coil 61 of valve 45 is energized and coil 62 of valve 45 is de-energized. The coils are energized by an appropriate skew detection circuit as is explained more fully hereinafter.

In the illustrated position of the valves 45, 46 hydraulic fluid is pumped from the tank 65 by a motor driven hydraulic pump 66 through conduits 67 and 68 to the pressure inlet port 47 and hence through pressure port 48 and conduit 69 to the top of hydaulic motor 37 of the braking mechanism 20. At this time fluid is drained from the lower end of the motor 37 via conduit 75, port 49, through the interior of the valve and drain port 51 to the drain conduit 52. Thus with the coil 61 of valve 45 energized the braking shoe 23 is forced downwardy into engagement with the rail 12 until such time as the skew is corrected and the bridge of the crane is transversely aligned between the rails. When the skewed condition is corrected, the coil 61 is de-energized as is more fully explained hereinafter, causing the spool 78 of valve 45 to be moved to the right as viewed in FIGURE 2 by a tension spring 79. In this spool position, the pressure port 49 is open to the fluid pressure inlet port 47 and the pressure port 48 is blocked from the pressure inlet port 47. Thus fluid flows from the pump 66 via conduits 67, 68 through the valve and conduit 75 to the lower side of the motor 37. Simultaneously, fluid is drained through the conduit 69 and the valve via conduits 80 and 52 to the tank. Thus the brake shoe 23 is moved upwardly and disengaged from the rail.

As viewed in FIGURE 2, the brake shoe 60 is shown in the raised or rail disengaged position. In this position, the coil 62 of valve 46 is de-energized and fluid under pressure is supplied to the lower side of motor 37. Thus the shoe 60 is held and maintained in the disengaged position away from the rail. Since the hydraulic circuits to both motors are identical, the operation and fluid control system construction of this braking assembly will not be described in detail.

Referring now to FIGURE 1, there is shown a diagrammatic illustration of the electrical circuit for detecting skew and energizing the proper solenoid actuated valve 45, 46 to correct it. Skew is that condition which exists when the wheel axis is not located in a vertical plane normal to the rails. It may be the result of numerous factors the most common of which is the starting or stopping of the bridge with the trolley located on one side of the bridge. In this condition a turning moment results from starting or stopping which causes the bridge to become skewed relative to the rails. When this condition is detected, the brake shoe on the leading side of the bridge is forced into engagement with the rail so as to cause the leading side to be slowed or retarded until the opposite side catches up with it.

To detect skew, four switch actuating rollers 81 are mounted upon the bridge with one roller being located adjacent each of the four wheels. The rollers are spring biased into engagement with the inside edge of the rails so that they remain in engagement with the rails at all times irrespective of the skewed condition of the bridge.

Each roller is rotatably journalled upon a stem 82 mounted for reciprocation in a bracket (not shown) attached to the bridge. Each stem 82 has a laterally extending flange which forms an abutment surface for a compression spring 83 mounted over the stem between the flange 84 and the edge of the bracket which supports the stem 82. The opposite end of the stem is engageable with the blade 85 of one of the normally open switches 86, 87, 88 and 89. Thus when the bridge becomes skewed relative to the rails, two of the rollers located on diagonally opposite sides of the bridge will be forced inwardly causing the stem upon which each roller is mounted to close the switch with which the roller is associated. For example as viewed in FIGURE 1 if the skew occurs as a result of counterclockwise rotation of the bridge as it is moving to the right, the rollers on the left front and right rear sides of the bridge will be forced inwardly causing their associated switches 86, 88 to be closed.

The diagonally opposite switches 86, 88 are connected in series to a relay R2 so that upon closing of both of them the relay will be energized. A contact CR–2 of relay R2 is in turn connected in series to the coil 61 of valve 45 so that upon energization of the relay R2 the coil 61 of valve 45 will be energized.

Similarly the diagonally opposite switches 85, 87 are connected in series in a circuit to relay R1, the contact CR–1 of which is in another series circuit with the coil 62 of valve 46. Thus when both switches 85, 87 are closed, the relay R1 will be energized closing the contact CR–1 in the circuit to the coil 62 of valve 46.

Assuming skew occurs in the counterclockwise direction, power is supplied from a 115 volt A.C. source to the relay R2 via leads 90, 91, through switch 86, via lead 92, through switch 88, and via leads 93, 94 and 95. Energization of the relay R2 closes the contact CR–2 of relay R2 completing a circuit to the coil 61 of valve 45 via leads 90, 91, 97, through contact CR–2 and leads 98, 99 and 95. Energization of the coil 61 actuates the valve so as to permit fluid flow from the pump 66 to the top side of the hydraulic motor 37 causing the brake shoe to be forced downwardly into engagement with the rail 12. Engagement between the brake shoe 23 and the rail retards the movement of the left side of the bridge assuming it is moving from left to right as viewed in FIGURE 1 until such time as each wheel axis becomes located in a vertical plane normal to the rails. At this time the switches 86 and 88 will be opened, opening the circuit to the relay R2 and thus opening the contact CR–2 de-energizing the coil 61 of valve 45. De-energization of the coil 61 in turn causes fluid flow to the lower side of cylinder 37 causing the brake shoe 23 to be disengaged from the rail.

In a similar manner, if the bridge were to become skewed by clockwise rotation of the bridge as viewed in FIGURE 1, the switches 87 and 89 would be closed thereby energizing the relay R1 and closing the contact CR–1. Closing of the contact CR–1 energizes the coil 62 of valve 46 thereby actuating the braking assembly 21 on the opposite side of the bridge so that movement of this side of the bridge is retarded or slowed until the wheel axes are properly aligned with respect to the rails.

Having described my invention, I claim:

1. An anti-skew device for an overhead crane including a bridge having flanged wheels running upon horizontally spaced rails, said device comprising, frictional braking means selectively engageable with each of said rails to slow the movement of one side relative to the other, means for detecting transverse misalignment between said bridge and said rails, and means responsive to transverse misalignment between said bridge and rails to apply said braking means to the rail on that side of the bridge which is longitudinally forward of the other side.

2. An overhead crane comprising, a bridge having flanged wheels running upon a pair of horizontally spaced rails, frictional braking means mounted upon said bridge and selectively engageable with each of said rails to slow the movement of one side relative to the other, means for detecting transverse misalignment between said bridge and said rails, and means responsive to transverse misalignment between said bridge and rails to apply said braking means to the rail on that side of the bridge which is forward of the other side.

3. An anti-skew device for an overhead crane including a bridge having flanged wheels running upon a pair of horizontally spaced rails, said device comprising, a pair of frictional brake shoes each selectively engageable with one of said rails to slow the movement of one side of the bridge relative to the other, and means including a pair of hydraulic motors responsive to transverse misalignment between said bridge and rails to move one of said shoes into engagement with the rail on that side of the bridge which is leading the other side.

4. An overhead crane comprising, a bridge having flanged wheels running upon a pair of horizontally spaced rails, a pair of frictional brake shoes each selectively engageable with one of said rails to slow the movement of one side of said bridge relative to the other, a pair of hydraulic motors mounted on opposite sides of said bridge operable to move said shoes into engagement with said rails, and means responsive to transverse misalignment between said bridge and rails to actuate the hydraulic motor on that side of the bridge which is leading the other side.

5. An overhead crane comprising, a bridge having flanged wheels running upon a pair of horizontally spaced rails, a pair of frictional brake shoes each selectively engageable with one of said rails to slow the movement of one side of said bridge relative to the other, a pair of hydraulic motors mounted on opposite sides of said bridge operable to move said shoes into engagement with said rails, and means including at least a pair of electrical switches mounted on opposite sides of said bridge and having actuators engageable with said rails to detect transverse misalignment between said bridge and rails and actaute the hydraulic motor on that side of the bridge which is leading the other side.

6. An overhead crane comprising, a bridge having two flanged wheels running upon each of a pair of horizontally spaced rails, a pair of frictional brake shoes each selectively engageable with one of said rails to slow the movement of one side of said bridge relative to the other, a pair of hydraulic motors mounted on opposite sides of said bridge operable to move said shoes into engagement with said rails, and means including four electrical switches mounted on said bridge adjacent each of said wheels and having actuators engageable with said rails to detect transverse misalignment between said bridge and rails and actuate the hydraulic motor on that side of the bridge which is forward of the other side.

References Cited by the Examiner

UNITED STATES PATENTS

| | | | |
|---|---|---|---|
| 1,297,083 | 3/19 | Brown | 105—61 X |
| 1,383,286 | 7/21 | Burton | 105—61 |
| 1,592,320 | 7/26 | Younie | 188—41 |
| 2,556,503 | 6/51 | Nelson | 105—163 |
| 2,984,191 | 5/61 | Smith | 105—163 |

LEO QUACKENBUSH, *Primay Examiner*.